(12) United States Patent
Zhao

(10) Patent No.: US 8,339,382 B2
(45) Date of Patent: Dec. 25, 2012

(54) STYLUS AND ELECTRONIC DEVICE USING THE SAME

(75) Inventor: Rui-Xue Zhao, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 850 days.

(21) Appl. No.: 12/489,538

(22) Filed: Jun. 23, 2009

(65) Prior Publication Data

US 2010/0164907 A1 Jul. 1, 2010

(30) Foreign Application Priority Data

Dec. 27, 2008 (CN) .......................... 2008 1 0306605

(51) Int. Cl.
*G06F 3/033* (2006.01)
*B43K 29/00* (2006.01)

(52) U.S. Cl. ........................................ 345/179; 401/195

(58) Field of Classification Search .......... 345/156–184; 178/18.01–20.04; 401/6
See application file for complete search history.

(56) References Cited

U.S. PATENT DOCUMENTS

| 4,973,180 | A  | * | 11/1990 | Hori | 401/141 |
|---|---|---|---|---|---|
| 5,509,445 | A  | * | 4/1996  | Couet | 137/533.11 |
| 6,510,869 | B1 | * | 1/2003  | Ouchi et al. | 137/533.15 |
| 2003/0197682 | A1 | * | 10/2003 | Huang | 345/163 |
| 2004/0253042 | A1 | * | 12/2004 | Fiffie | 401/195 |
| 2007/0110494 | A1 | * | 5/2007  | Berman | 401/6 |

* cited by examiner

*Primary Examiner* — Alexander Eisen
*Assistant Examiner* — Patrick F Marinelli
(74) *Attorney, Agent, or Firm* — Altis Law Group, Inc.

(57) ABSTRACT

A stylus includes a tube body, a touch end connected to the tube body, an inflatable balloon enwrapping the tube body such that the tube body and the balloon cooperatively define a sealed chamber, and an inflating mechanism for inserting gas into the sealed chamber to inflate the balloon and therefore, the size of the stylus is adjustable and convenient for using.

18 Claims, 4 Drawing Sheets

STYLUS AND ELECTRONIC DEVICE USING THE SAME

BACKGROUND

1. Technical Field

The present disclosure generally relates to touch screen technology, and particularly to a stylus and an electronic device using the same.

2. Description of the Related Art

With the development of communication technology, more electronic devices, such as personal digital assistants (PDAs), and smart phones, with touch panels, are widely used. An electronic device may utilize a stylus used to control the touch panel.

A commonly used stylus includes a tube body and a touch end formed at an end of the tube body. The tube body may be a hollow metallic body with electronic components such as an antenna received therein. The touch end is used to write on a screen of an electronic device. Accordingly, a side surface or rear surface of the electronic device may define an accommodating hole to receive the stylus.

However, with the developing trend and changes in market demand, the electronic device becomes smaller and thinner. As a result, the size of the stylus has also been miniaturized to adapt to the smaller size of the electronic device. However, the stylus having small size may be inconvenient to operate such as hard to grip and write.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

The present stylus may be used to any electronic device with a touch panel, such as a PDA, a mobile phone, and others.

Figure 1:
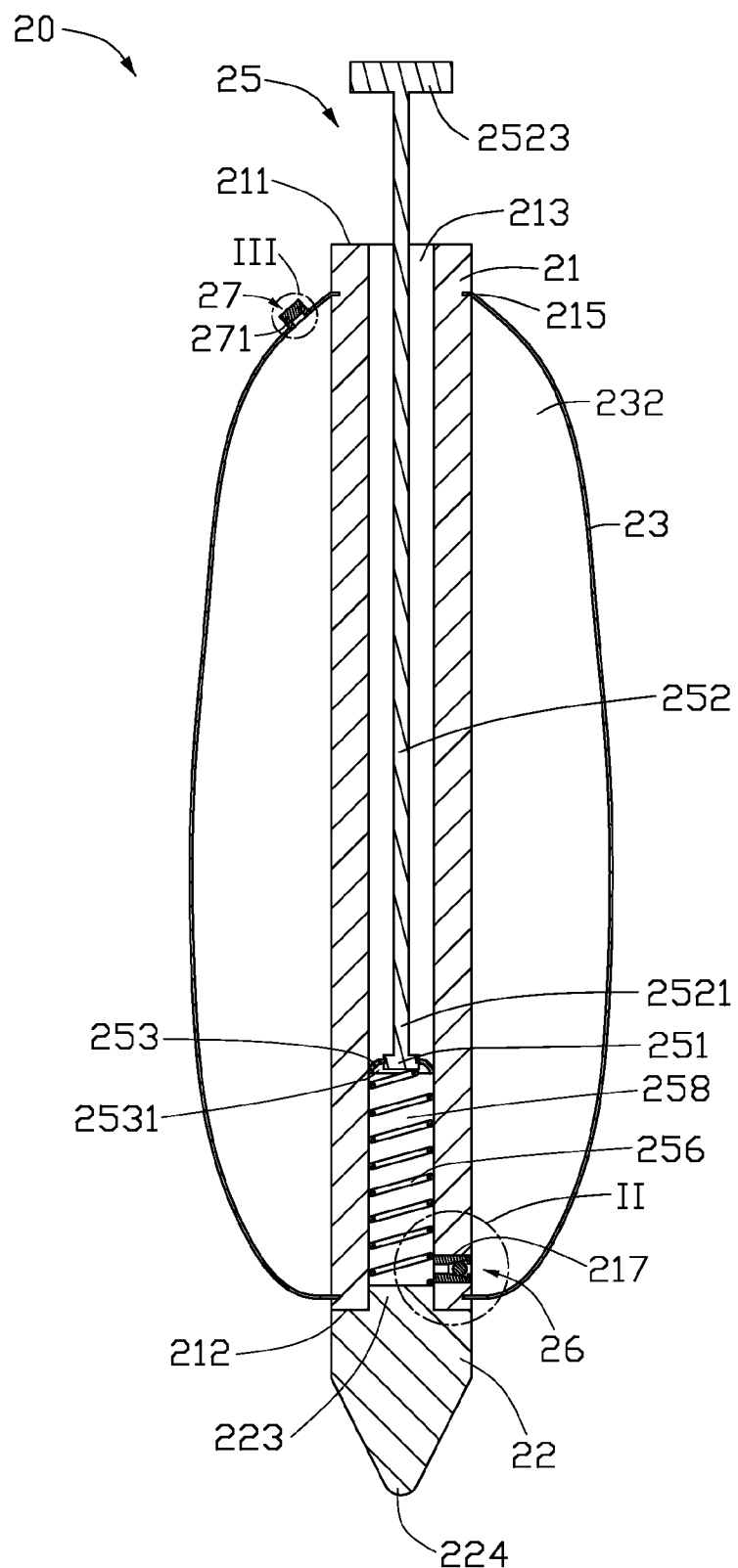
FIG. 1 is a cross-sectional view of an embodiment of a stylus in an inflated state, the stylus having a gas intake and a gas outlet.

Referring to FIG. 1, an embodiment of a stylus 20 includes a tube body 21, a touch end 22, an inflatable balloon 23 enwrapping the tube body 21, an inflating mechanism 25, a gas intake 26 and a gas outlet 27. The tube body 21 and the balloon 23 cooperatively define a sealed chamber 232. The inflating mechanism 25 is used to fill gas into the sealed chamber 232 through the gas intake 26 to enable the balloon 23 to inflate, such that the volume and external diameter of the stylus 20 can be enlarged. The gas in the sealed chamber 232 is capable of venting out of the sealed chamber 232 through the gas outlet 27 to allow the balloon 23 to return to an original shape.

The tube body 21 is substantially a hollow metallic cylinder, and includes a first end 211, a second end 212 opposite to the first end 211, and an gas conduit 213 extending therethrough. A circumference surface of the tube body 21 defines two annular grooves 215 adjacent to the first end 211 and the second end 212 respectively, and a hole 217 communicating with the gas conduit 213 adjacent to the second end 212.

The touch end 22 includes a connecting portion 223 and a touch nib 224 integrally formed with the connecting portion 223. The connecting portion 223 is connected to the tube body 21 for sealing the second end 212.

The balloon 23 is inflatable and flexible, may be made of rubber, latex, polychloroprene, or nylon fabric. The balloon 23 may be substantially pipe-like shape and has two ends (not labeled) connected to the first and second ends 211, 212 of the tube body 21 respectively by latching into the annular grooves 215, such that the balloon 23 and the tube body 21 cooperatively define the sealed chamber 232. Therefore, as gas is inserted into the sealed chamber 232, the balloon 23 is capable of inflating, thus increasing the volume and external diameter of the stylus 20.

The inflating mechanism 25 includes a piston 251, a piston shaft 252, a sealing member 253, and an elastic member 256. The piston 251 is movably received in the gas conduit 213. The piston shaft 252 has a connecting end 2521 connected to the piston 251 and a controlling end 2523 opposite the connecting end 2521. The controlling end 2523 extends out of the tube body 21. Thus, the piston 251 and piston shaft 252 can move together along a longitudinal axis of the gas conduit 213 as an external force is applied on the controlling end 2523.

The sealing member 253 is an elastic member, may be made of rubber and have a substantially bowl-like shape, with an opening 2531 towards the touch end 22 and a through hole (not labeled) in the center. The sealing member 253 is sleeved on the piston 251 via the through hole, and elastically resists on the inner surface of the gas conduit 213.

The elastic member 256 is metallic and coiled, with an outer diameter smaller than an inner diameter of the gas conduit 213 and received in the gas conduit 213. The elastic member 256 has a first end attached to the touch end 22, and an second end attached to the piston 251, such that the elastic member 256 can be compressed when the piston 251 move towards the touch end 22.

Figure 2:
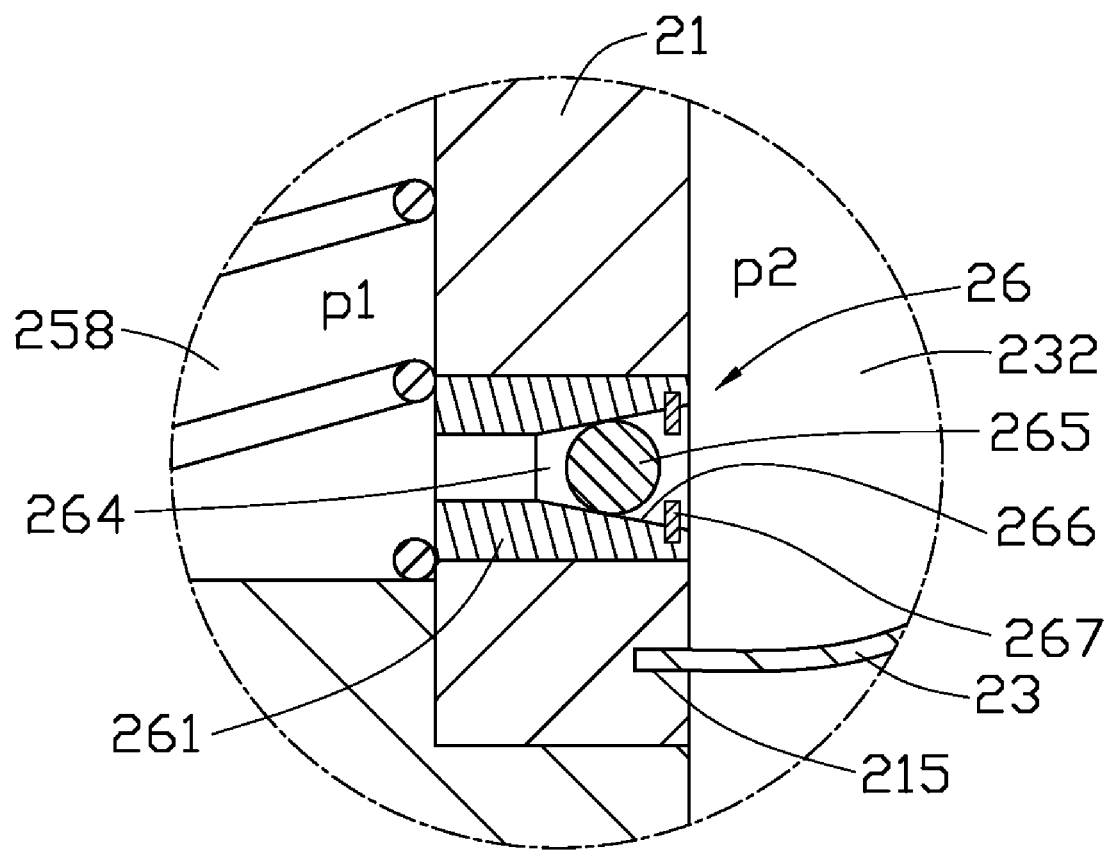
FIG. 2 is an enlarged view of a circled portion II of FIG. 1, and showing the gas intake.

Referring to FIG. 2, the gas intake 26 includes a valve member 261 and an obstructing member 265. The valve member 261 defines a hole 264 communicating the gas conduit 213 and the sealed chamber 232, and includes a conical inner surface 266. In the illustrated embodiment, an end of the inner surface 266 having the largest diameter is adjacent to the sealed chamber 232. The obstructing body 265 is substantially spherical and movably received in a chamber defined by the inner surface 266. The obstructing body 265 is capable of controlling the gas to flow into the sealed chamber 232 by moving along the axis of the hole 264. Furthermore, an annular protruding portion 267 extending into the hole 264 may be mounted in the inner surface 266 adjacent to the end having largest diameter to prevent the obstructing body 265 from sliding out of the valve body 261.

Figure 3:
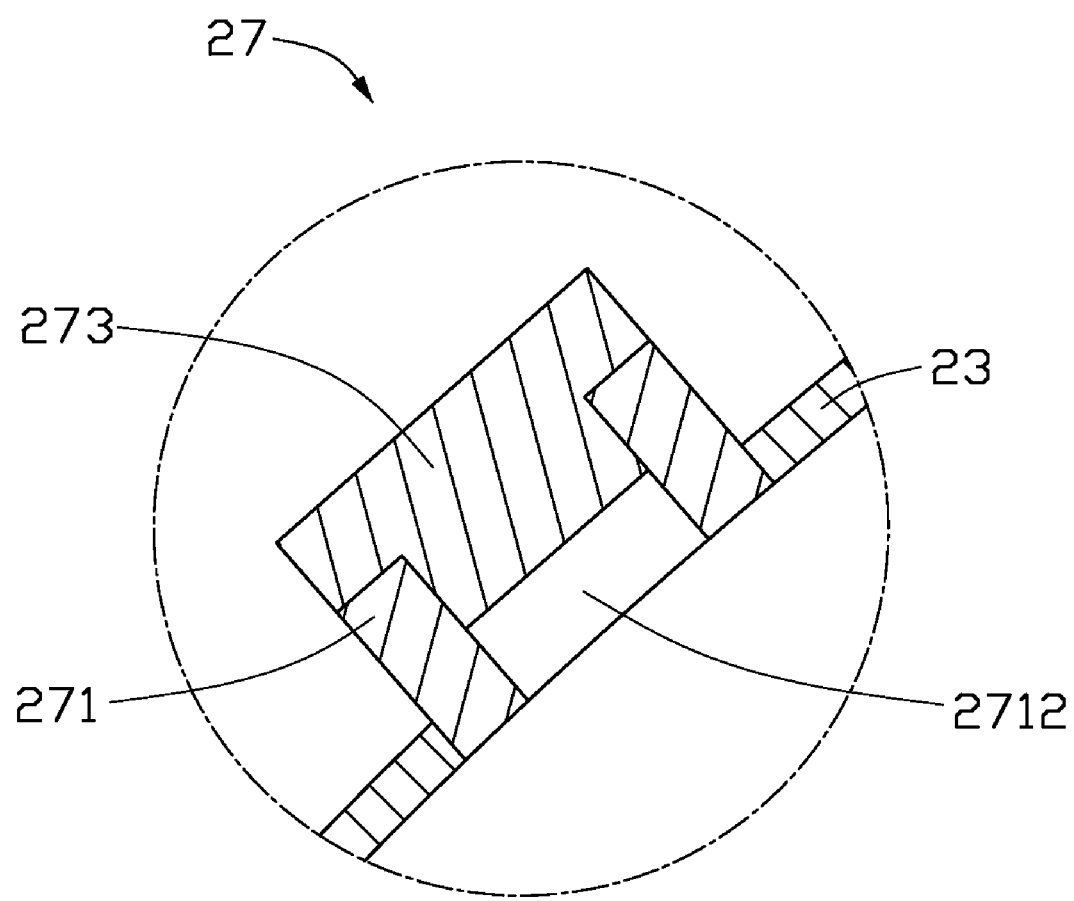
FIG. 3 is an enlarged view of a circled portion III of FIG. 1, and showing the gas outlet.

Referring to FIG. 3, the gas outlet 27 includes a connecting member 271 and a snap button 273 connecting with the connecting member 271. The snap button 273 acts as a seal to prevent the gas from venting out. The connecting member 271 defines an opening 2712 communicating with the sealed chamber 232, and the snap button 273 can be inserted into the opening 2712 and therefore, as the connecting member 271 is fixed to the balloon 23, the gas flowing out to atmosphere can be controlled by whether the snap button 273 is fixed to the connecting member 271 or not.

Referring to FIGS. 1 through 3, to assemble the stylus 20, the elastic member 256 is received in the gas conduit 213, with one end attaching to the touch end 22. The piston 251 is inserted into the gas conduit 213, with the sealing member 253 sleeved thereon and positioned above the elastic member 256. Therefore, the piston 251, the side wall of the gas conduit 213 and the touch end 22 cooperatively define a gas cavity 258 therebetween. The gas intake 26 is received in the hole 217, and then the balloon 23 is connected to the tube body 21 and cooperatively define the sealed chamber 232, such that the gas intake 26 is capable of communicating the gas cavity 258 and the sealed chamber 232. The gas outlet 27 is connected to the balloon 23 for communicating the sealed chamber 232 and the atmosphere via the opening 2712 provided by the connecting member 271.

Figure 4:
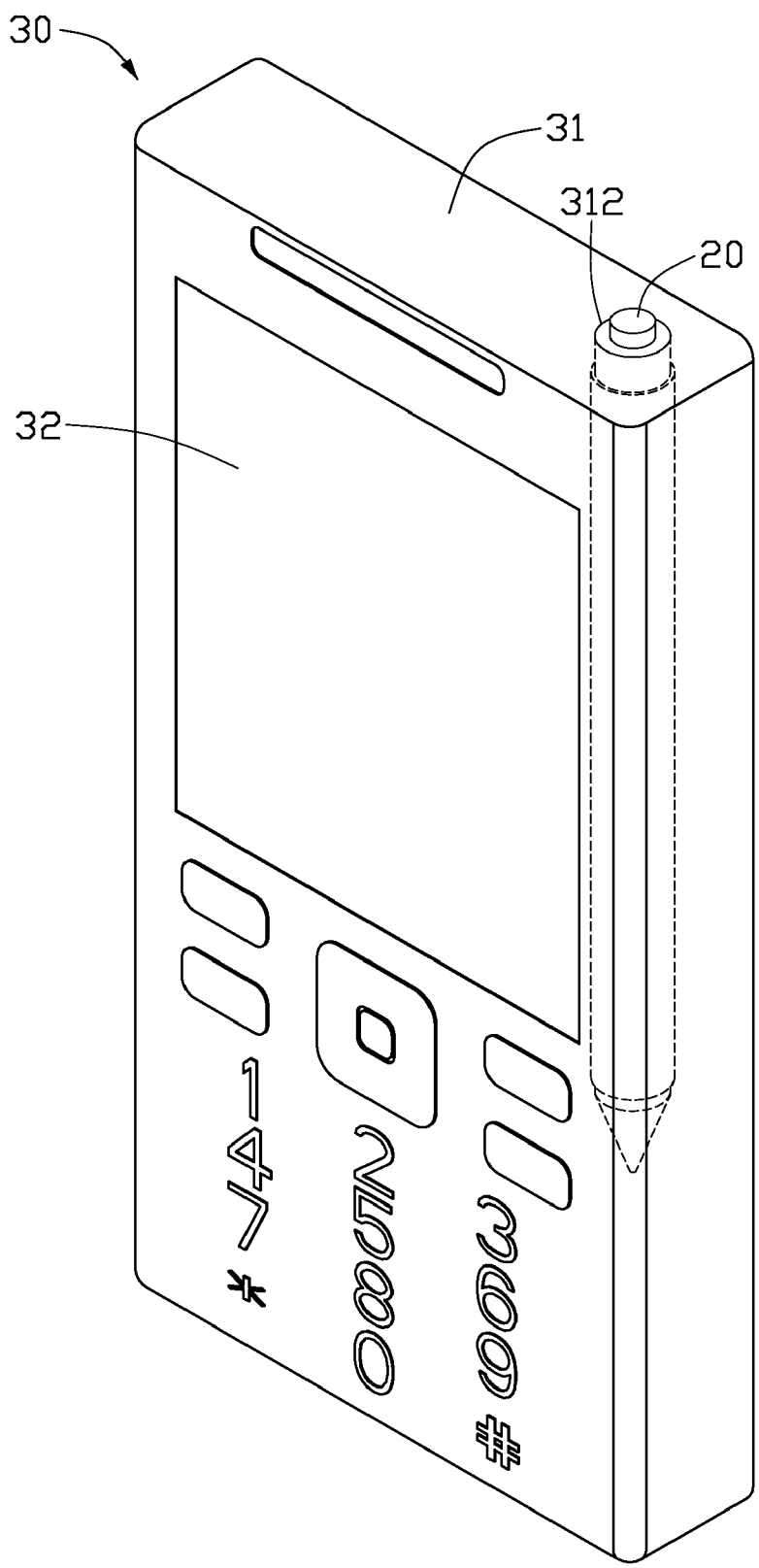
FIG. 4 is an assembled, isometric view of the stylus of FIG. 1 and an embodiment of an electronic device applying the stylus.

Referring to FIG. 4, an embodiment of an electronic device 30 applying the stylus 20 includes a main body 31 and a touch panel 32 mounted thereon. The electronic device 30 defines an accommodating hole 312 corresponding to the stylus 20. The accommodating hole 312 extends substantially along the longitudinal axis of the main body 31. When not in use, the stylus 20 can be received in the accommodating hole 312 for storage and carrying.

Referring to FIGS. 1 through 3 again, to enlarge the volume and external diameter of the stylus 200, the snap button 273 is attached to the connecting member 271 and an external force is applied on the controlling end 2523 of the piston shaft 252 to push the piston 251 to move towards the touch end 22. The sealing member 253 is deformed and elastically resists on the inner surface of the gas conduit 213 due to the pushing force, such that the gas in the gas cavity 258 is sealed and the gas pressure p1 in the gas cavity 258 is increased due to the compressed gas. As p1 exceeding the gas pressure p2 in the sealed chamber 232, the obstructing body 265 can move away from the tube body 21 to enable the gas fill into the sealed chamber 232, as a result the balloon 23 is inflated and the external diameter of the stylus 20 is increased. In this process, the elastic member 256 is compressed and accumulates elastic force, therefore, the piston 251 is capable of moving away from the touch end 22 automatically by the elastic force as the external force is released. As the piston 251 moves away from the touch end 22, the gas pressure p1 decreases, and the sealed member 253 is capable of deflating to allow the exterior gas to enter into the gas cavity 258. Furthermore, the external diameter of the stylus 20 can be enlarged to a predetermined size by repeatedly pushing the piston shaft 252, thus allowing the stylus 20 to adapt to different users. When not in use, the snap button 273 is detached from the connecting member 271, such that the gas in the sealed chamber 232 can vent out and the balloon 23 may return to its original shape by the intrinsic flexibility.

It should be understood that, the tube body 21 may includes a fastening mechanism (not shown) to securely attach the piston 252 to the tube body 21 when the stylus 20 is not in use.

It is believed that the present embodiments and their advantages will be understood from the foregoing description, and it will be apparent that various changes may be made thereto without departing from the spirit and scope of the embodiments or sacrificing all of its material advantages, the examples hereinbefore described merely being preferred or exemplary embodiments.

What is claimed is:

1. A stylus, comprising:
a tube body defining a gas conduit extending therethrough;
a touch end connected to the tube body;
an inflatable balloon enwrapping the tube body such that the tube body and the balloon cooperatively define a sealed chamber; and an inflating mechanism for inserting gas into the sealed chamber to inflate the balloon;
a gas intake comprising a valve member and an obstructing member movably received in the valve member for controlling the gas to flow into the sealed chamber; and
a gas outlet, directly connected to the inflatable balloon, through which gas is vented out of the sealed chamber to allow the balloon to return to an original shape;
wherein the valve member defines a hole for communicating the gas conduit and the sealed chamber, the obstructing body is movably received in the hole; the valve member comprises a conical inner surface whose largest diameter is adjacent to the sealed chamber, and the obstructing member is substantially spherical and movably received in a chamber defined by the inner surface.

2. The stylus of claim 1, wherein the gas outlet comprises a connecting member connected to the balloon and a snap button seal-connected to the connecting member, the connecting member defines an opening communicating with the sealed chamber.

3. The stylus of claim 1, wherein the tube body is a substantially hollow metallic cylinder, and further defines another hole communicating the gas conduit and the sealed chamber, the valve member is positioned in the hole of the tube body.

4. The stylus of claim 3, wherein the tube body further comprises a first end, a second end opposite to the first end, and a circumferential surface defining two annular grooves adjacent to the first and second ends respectively for attaching the balloon to the tube body.

5. The stylus of claim 4, wherein the inflating mechanism comprises a piston, a piston shaft connected to the piston, and a sealing member sleeved on the piston.

6. The stylus of claim 5, wherein the sealing member is elastic and substantially bowl-shaped, with an opening towards the touch end.

7. The stylus of claim 5, wherein the inflating mechanism comprises an elastic member positioned between the touch end and the piston.

8. The stylus of claim 7, wherein the elastic member is substantially metallic and coiled, and has an outer diameter smaller than a diameter of the gas conduit.

9. The stylus of claim 1, wherein the balloon is made of rubber, latex, polychloroprene, or nylon fabric.

10. The stylus of claim 1, wherein the balloon is substantially pipe-shaped.

11. The stylus of claim 1, wherein the gas intake further comprises a protruding portion mounted in the inner surface, and the protruding portion extends into the hole to prevent the obstructing member from sliding out of the valve member.

12. An electronic device, comprising:
a main body defining an accommodating hole;
a touch panel mounted on the main body; and
a stylus received in the accommodating hole, the stylus comprising:
a tube body defining a gas conduit extending therethrough;
a touch end connected to the tube body;
an inflatable balloon enwrapping the tube body such that the tube body and the balloon cooperatively define a sealed chamber;
an inflating mechanism for inserting gas into the sealed chamber to inflate the balloon;
a gas intake comprising a valve member and an obstructing member movably received in the valve member for controlling the gas to flow into the sealed chamber; and
a gas outlet, directly connected to the inflatable balloon, through which gas is vented out of the sealed chamber to allow the balloon to return to an original shape;

wherein the valve member defines a hole for communicating the gas conduit and the sealed chamber, the obstructing body is movably received in the hole; the valve member comprises a conical inner surface whose largest diameter is adjacent to the sealed chamber, and the obstructing member is substantially spherical and movably received in a chamber defined by the inner surface.

13. The electronic device of claim 12, wherein the accommodating hole substantially extends along the longitudinal axis of the main body.

14. The electronic device of claim 12, wherein the inflating mechanism comprises a piston, a piston shaft connected to the piston, a sealing member sleeved on the piston, and an elastic member positioned between the touch end and the piston.

15. A stylus comprising:
a tube body defining a gas conduit extending therethrough;
a touch end connected to the tube body;
an inflatable balloon enwrapping the tube body such that the tube body and the balloon cooperatively define a sealed chamber;
an inflating mechanism for inserting gas into the sealed chamber to inflate the balloon, the inflating mechanism comprising a piston movably received in the gas conduit, a piston shaft connected to the piston, and a sealing member sleeved on the piston;
a gas intake comprising a hole communicating the gas cavity and the sealed chamber; and
a gas outlet, directly connected to the inflatable balloon, through which gas is vented out of the sealed chamber to allow the balloon to return to an original shape;
wherein the piston, the inner wall of the gas conduit and the touch end cooperatively define a gas cavity therebetween, the sealing member has an opening towards the touch end and elastically resists on the inner wall of the gas conduit, when an external force is exerted on the piston shaft to push the piston to move towards the touch end, the sealing member is deformed and elastically resists on the inner wall of the gas conduit to seal and compress the gas in the gas cavity, thereby driving the gas in the gas cavity to fill the sealed chamber via the hole.

16. The stylus of claim 15, wherein the inflating mechanism further comprises an elastic member positioned between the touch end and the piston, when the piston shaft is pushed by the external force, the elastic member is compressed and accumulates elastic force with the movement of the piston, such that the piston is capable of moving away from the touch end automatically by the elastic force as the external force is released.

17. The stylus of claim 15, wherein the gas intake further comprises a valve member and an obstructing member, the hole is defined through the valve and forming a conical inner surface in the hole, an end of the inner surface having the largest diameter is adjacent to the sealed chamber, the obstructing member is substantially spherical and movably received in a chamber defined by the inner surface for controlling the gas to flow into the sealed chamber.

18. The stylus of claim 17, wherein the gas intake further comprises a protruding portion mounted in the inner surface, and the protruding portion extends into the hole to prevent the obstructing member from sliding out of the valve member.

* * * * *